Patented June 13, 1933

1,913,796

UNITED STATES PATENT OFFICE

FRANK R. DEUTMAN, OF ST. LOUIS, MISSOURI, ASSIGNOR TO SWANN RESEARCH, INC., A CORPORATION OF ALABAMA

FREE FLOWING MONOCALCIUM PHOSPHATE

No Drawing.   Application filed June 3, 1931. Serial No. 541,957.

This invention relates to mono calcium phosphate and more particularly to an improved mono calcium phosphate having better free flowing properties and which is more resistant to caking than that heretofore produced.

This invention has as an object mono calcium phosphate which does not cake readily in storage. It has as a further object the production of mono calcium phosphate which is free flowing when handled in the usual mechanical equipment of the self rising flour industry.

In the manufacture of mono calcium phosphate, phosphoric acid is caused to react with hydrated lime in the dry form and a product of such fine crystal structure is obtained that it does not even when dry, flow easily through the handling equipment of flour mills where it is used in the production of self rising flour and phosphate plain flour. The product has a further disadvantage in that when stored for several months, even in a dry place, it cakes or lumps in the barrel or bag, a result which renders it unsuited for uniform dissemination through the flour in a finely divided state. This disadvantage may to some extent be overcome by increasing the dicalcium phosphate content of the product but such improvement in this respect is not obtained without materially lowering the mono calcium phosphate content, and consequently the neutralizing value of the product to a point that is undesirable.

The objects of this invention are accomplished according to the following disclosure which describes a process for producing mono calcium phosphate containing a small percentage of magnesium carbonate. It is common knowledge that the mono calcium phosphate of commerce is not pure $CaH_4P_2O_8.H_2O$ but contains in addition to this compound, some dicalcium phosphate, $Ca_2H_2P_2O_8.4H_2O$ and possibly also some tricalcium phosphate, $Ca_3P_2O_8$. By the use of the term, mono calcium phosphate, I do not limit myself to the pure compound $CaH_4P_2O_8.H_2O$ but intend thereby to include the commercial product known as mono calcium phosphate, which, while consisting essentially of $CaH_4P_2O_8.H_2O$, contains also lesser quantities of di- and tricalcium phosphates.

I have now found that mono calcium phosphate may be materially improved with respect to resistance to caking in storage and with respect to free flowing if it contains in admixture 0.5% to 5.0% magnesium carbonate, a preferred amount being 2%. The magnesium carbonate may be incorporated in the dry mono calcium phosphate in any convenient manner which may readily suggest itself to those versed in the art of chemical manufacture.

As an illustration of how mono calcium phosphate containing an effective quantity of magnesium carbonate may be advantageously produced, I describe in detail the following procedure:

I provide a pilot mix by placing 800 pounds of dry mono calcium phosphate in a suitable mixer mechanically agitated and adding thereto 200 pounds of dry, finely-divided magnesium carbonate. After agitating until the materials are uniformly mixed, I add 100 pounds of this pilot mix to 900 pounds of mono calcium phosphate in a similar mixer mechanically agitated and continue stirring until thoroughly mixed. I then dump the mixture into suitable containers for shipment.

Although the use of powdered magnesium carbonate in admixture with mono calcium phosphate as proposed in this invention conceivably provides conditions suitable for a reaction between these two ingredients, I have found that when the invention is practiced as above outlined, very little reaction takes place. This is due to the fact that very little free moisture is present in the products.

However, because of the presence of this potential alkali which becomes effective when water is added to release the leavening power, say in the use of baking powder mixtures, it is necessary and desirable to take into account the neutralizing value of the magnesium carbonate present. Thus if a neutralizing value of 80 (80 units of sodium bicarbonate per 100 units of mono calcium phosphate) is desired, a mono calcium phosphate having an original neutralizing value of 82 must be used, together with 2.0% of magnesium carbonate.

Mono calcium phosphate containing 0.5% to 5.0% of powdered magnesium carbonate successfully resists a tendency to cake in storage and presents a suitable mechanical condition for handling in the equipment of flour mills for the manufacture of self rising flour and phosphated plain flour.

As an illustration of the effectiveness of my invention over untreated mono calcium phosphate, I describe the following tests: Bag quantities of mono calcium phosphate with and without magnesium carbonate were made in a small dry mixer and subjected to pressure equivalent to that prevailing in phosphate storage. This was done by laying the bags flat and placing 300-lb. barrels on top with planks between the barrels and the bags. After three weeks the materials were examined for caking characteristics and it was found that the ordinary mono calcium phosphate was in one hard lump, whereas that containing 1½% magnesium carbonate was quite friable and easily handled.

Samples of straight mono calcium phosphate and those containing varying percentages of magnesium carbonate were tested on a flowmeter for measuring the rate of flow of powdered materials through an orifice with the following results:

|  | Grams per minute |
|---|---|
| Straight mono calcium phosphate | 26.5 |
| Phosphate plus 1.0% magnesium carbonate | 27.4 |
| Phosphate plus 1.5% magnesium carbonate | 28.0 |
| Phosphate plus 2.0% magnesium carbonate | 29.8 |
| Phosphate plus 4.0% magnesium carbonate | 30.6 |

I am aware of U. S. Patent 1,785,473, in which the addition during manufacture of magnesium compounds to mono calcium phosphate is proposed. The effect of such magnesium compounds during manufacture, as pointed out in this patent, is to produce a relatively hard granular material. Such an effect can only be obtained as the result of a reaction between the magnesium compounds and the phosphoric acid, by adding the magnesium compounds during the process of manufacture. The magnesium compounds are believed to be present as magnesium phosphate. My problem on the other hand, was the production of a non-caking, free-flowing mono calcium phosphate which will remain so in storage. Since my product is used as a finely divided powder, the strength of the granules is not important. I have found further that the magnesium carbonate which I mix with mono calcium phosphate will remain substantially unreacted and will maintain the free-flowing, non-caking qualities of the latter substance.

While I have described my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A free-flowing, non-caking mono calcium phosphate containing between 0.5 and 5% magnesium carbonate.

2. A free-flowing, non-caking mono calcium phosphate containing between 0.5 and 5% of substantially unreacted magnesium carbonate.

3. A free-flowing, non-caking mono calcium phosphate containing approximately 2% of substantially unreacted magnesium carbonate.

4. A method of maintaining the free-flowing, non-caking qualities of mono calcium phosphate comprising providing a dry powdered mono calcium phosphate and adding thereto between 0.5% and 5% of powdered magnesium carbonate.

5. A method of maintaining the free-flowing, non-caking qualities of mono calcium phosphate comprising providing a dry powdered mono calcium phosphate and adding thereto approximately 2% of powdered magnesium carbonate.

6. A method of inhibiting caking in granular mono calcium phosphate comprising adding from 0.5 to 5% of dry powdered magnesium carbonate thereto.

In testimony whereof I affix my signature.

FRANK R. DEUTMAN.